United States Patent
Shin et al.

(10) Patent No.: US 7,782,308 B2
(45) Date of Patent: *Aug. 24, 2010

(54) TOUCH SCREEN DEVICE AND METHOD OF METHOD OF DISPLAYING IMAGES THEREON

(75) Inventors: Sang Hyun Shin, Seoul (KR); Ji Suk Chae, Seoul (KR); Ho Joo Park, Seoul (KR); Young Ho Ham, Yongin (KR); Kyung Hee Yoo, Seoul (KR); Ji Ae Kim, Seoul (KR); Yu Mi Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 604 days.

This patent is subject to a terminal disclaimer.

(21) Appl. No.: 11/785,402

(22) Filed: Apr. 17, 2007

(65) Prior Publication Data

US 2007/0273667 A1 Nov. 29, 2007

Related U.S. Application Data

(63) Continuation of application No. 11/646,586, filed on Dec. 28, 2006.

(30) Foreign Application Priority Data

May 24, 2006 (KR) ...................... 10-2006-0046696

(51) Int. Cl.
*G06F 3/041* (2006.01)
(52) U.S. Cl. ....................... 345/173; 715/765
(58) Field of Classification Search ................ 715/765; 345/173
See application file for complete search history.

(56) References Cited

U.S. PATENT DOCUMENTS 5,140,678 A * 8/1992 Torres ........................ 715/777

(Continued)

FOREIGN PATENT DOCUMENTS

AU 2006330724 7/2007

(Continued)

OTHER PUBLICATIONS

European Search Report dated May 8, 2008.

(Continued)

*Primary Examiner*—Richard Hjerpe
*Assistant Examiner*—Jeffrey Steinberg
(74) *Attorney, Agent, or Firm*—KED & Associates LLP

(57) ABSTRACT

A touch screen device and method of displaying images using display windows and selecting execution menus displayed on the display windows in a touch screen device are provided. The touch screen device includes a screen, a display configured to display images thereon and a detector configured to detect a touch on the screen, and a controller configured to control operation of the touch screen device in accordance with the screen touch detected by the detector. The controller causes two or more display windows to be displayed in an overlapped manner. Further, if the touch is detected on an underlying display window covered by an overlying display window, the controller causes a display form to be changed in response to the touch. That is, if a touch is detected on the display window covered by the overlying display window, the touched display window is displayed as an overlying display window.

28 Claims, 9 Drawing Sheets

U.S. PATENT DOCUMENTS

| | | | |
|---|---|---|---|
| 5,191,645 A | 3/1993 | Carlucci et al. | |
| 5,495,566 A | 2/1996 | Kwatinetz | |
| 5,523,775 A | 6/1996 | Capps | |
| 5,526,011 A | 6/1996 | Hix et al. | |
| 5,548,705 A | 8/1996 | Moran et al. | |
| 5,559,944 A | 9/1996 | Ono | |
| 5,586,235 A | 12/1996 | Kauffman | |
| 5,592,608 A | 1/1997 | Weber et al. | |
| 5,596,699 A | 1/1997 | Driskell | |
| 5,757,368 A * | 5/1998 | Gerpheide et al. | 715/769 |
| 5,796,406 A | 8/1998 | Shigematsu et al. | |
| 5,821,936 A | 10/1998 | Shaffer et al. | |
| 5,831,616 A | 11/1998 | Lee | |
| 6,094,197 A | 7/2000 | Buxton et al. | |
| 6,097,387 A | 8/2000 | Sciammarella et al. | |
| 6,107,997 A * | 8/2000 | Ure | 345/173 |
| 6,259,436 B1 | 7/2001 | Moon et al. | |
| 6,310,615 B1 | 10/2001 | Davis et al. | |
| 6,334,003 B1 | 12/2001 | Yokota | |
| 6,459,442 B1 | 10/2002 | Edwards et al. | |
| 6,476,796 B1 * | 11/2002 | Kuzunuki et al. | 345/173 |
| 6,525,749 B1 | 2/2003 | Moran et al. | |
| 6,560,281 B1 | 5/2003 | Black et al. | |
| 6,724,370 B2 | 4/2004 | Dutta et al. | |
| 6,753,892 B2 | 6/2004 | Chung | |
| 6,765,557 B1 | 7/2004 | Segal et al. | |
| 6,883,140 B1 | 4/2005 | Acker et al. | |
| 6,883,145 B2 | 4/2005 | Jaeger | |
| 6,900,835 B2 | 5/2005 | Cazier et al. | |
| 6,940,494 B2 | 9/2005 | Hoshino et al. | |
| 6,957,395 B1 * | 10/2005 | Jobs et al. | 715/765 |
| 6,958,749 B1 | 10/2005 | Matsushita et al. | |
| 6,965,377 B2 | 11/2005 | Yanagisawa et al. | |
| 7,015,932 B1 | 3/2006 | Koike et al. | |
| 7,031,756 B1 | 4/2006 | Sim et al. | |
| 7,035,720 B2 | 4/2006 | Taxis | |
| 7,046,230 B2 | 5/2006 | Zadesky et al. | |
| 7,047,503 B1 | 5/2006 | Parrish et al. | |
| 7,158,913 B2 | 1/2007 | Park et al. | |
| 7,162,685 B2 | 1/2007 | Saito | |
| 7,164,410 B2 | 1/2007 | Kupka | |
| 7,164,432 B1 * | 1/2007 | Amemiya | 345/649 |
| 7,242,323 B2 | 7/2007 | Sato et al. | |
| 7,345,671 B2 | 3/2008 | Robbin et al. | |
| 7,348,967 B2 | 3/2008 | Zadesky et al. | |
| 7,406,666 B2 | 7/2008 | Davis et al. | |
| 7,434,177 B1 | 10/2008 | Ording et al. | |
| 7,456,823 B2 | 11/2008 | Poupyrev et al. | |
| 7,469,388 B1 | 12/2008 | Baudisch et al. | |
| 7,509,588 B2 | 3/2009 | Van Os et al. | |
| 2002/0011990 A1 | 1/2002 | Anwar | |
| 2002/0103616 A1 | 8/2002 | Park et al. | |
| 2002/0149569 A1 | 10/2002 | Dutta et al. | |
| 2003/0076306 A1 | 4/2003 | Zadesky et al. | |
| 2003/0142123 A1 | 7/2003 | Malamud et al. | |
| 2003/0174149 A1 | 9/2003 | Fujisaki et al. | |
| 2004/0095395 A1 | 5/2004 | Kurtenbach | |
| 2004/0100479 A1 | 5/2004 | Nakano et al. | |
| 2005/0024341 A1 | 2/2005 | Gillespie et al. | |
| 2005/0047629 A1 | 3/2005 | Farrell et al. | |
| 2005/0176502 A1 | 8/2005 | Nishimura et al. | |
| 2005/0251748 A1 | 11/2005 | Gusmorino et al. | |
| 2006/0013079 A1 | 1/2006 | Rekimoto | |
| 2006/0026536 A1 | 2/2006 | Hotelling et al. | |
| 2006/0085767 A1 | 4/2006 | Hinckley et al. | |
| 2006/0256091 A1 | 11/2006 | Hino | |
| 2006/0271947 A1 | 11/2006 | Lienhart et al. | |
| 2007/0018968 A1 | 1/2007 | Iwamoto et al. | |
| 2007/0075980 A1 | 4/2007 | Hsieh et al. | |
| 2007/0136690 A1 | 6/2007 | MacLaurin et al. | |
| 2007/0150842 A1 | 6/2007 | Chaudhri et al. | |
| 2007/0180392 A1 | 8/2007 | Russo | |
| 2008/0150905 A1 * | 6/2008 | Grivna et al. | 345/173 |
| 2009/0119613 A1 | 5/2009 | Nakaya | |

FOREIGN PATENT DOCUMENTS

| | | |
|---|---|---|
| EP | 1 037 135 | 9/2000 |
| GB | 2329813 | 3/1999 |
| JP | 05-158616 | 6/1993 |
| JP | 2002041242 | 2/2002 |
| TW | 200410853 | 7/2004 |
| WO | WO 00/38042 | 6/2000 |
| WO | WO 00/75766 | 12/2000 |
| WO | WO2005/073954 | 8/2005 |

OTHER PUBLICATIONS

Office Action dated Jan. 7, 2009 for U.S. Appl. No. 11/646,598.
Office Action dated Mar. 5, 2009 for U.S. Appl. No. 11/646,586.
Office Action dated Mar. 30, 2009 for U.S. Appl. No. 11/646,587.
Office Action dated Mar. 31, 2009 for U.S. Appl. No. 11/785,401.
Office Action dated Apr. 3, 2009 for U.S. Appl. No. 11/646,613.
Office Action dated May 4, 2009 for U.S. Appl. No. 11/646,597.
Office Action dated May 14, 2009 for U.S. Appl. No. 11/785,604.
Office Action dated May 26, 2009 for U.S. Appl. No. 11/785,405.
Office Action dated Jun. 9, 2009 for U.S. Appl. No. 11/785,403.
Office Action dated Aug. 6, 2009 for U.S. Appl. No. 11/646,598.
Office Action dated Sep. 18, 2009 for U.S. Appl. No. 11/646,586.
Office Action dated Oct. 20, 2009 for U.S. Appl. No. 11/646,604.
European Search Report for EP 07 10 0400 dated Oct. 20, 2009.
Office Action dated Nov. 13, 2009 for U.S. Appl. No. 11/646,587.
Office Action dated Nov. 13, 2009 for U.S. Appl. No. 11/646,613.
Office Action dated Nov. 13, 2009 for U.S. Appl. No. 11/785,405.
Indian Office Action dated Nov. 16, 2009.
Office Action dated Dec. 4, 2009 for U.S. Appl. No. 11/785,401.
Office Action dated Jan. 7, 2010 for U.S. Appl. No. 11/785,403.
Taiwanese Office Action issued in TW Application No. 095147947 dated Dec. 29, 2009 (translation).
U.S. Office Action issued in U.S. Appl. No. 11/785,400 dated Feb. 4, 2010.
U.S. Office Action issued in U.S. Appl. No. 11/646,598 dated Feb. 26, 2010.
U.S. Office Action issued in U.S. Appl. No. 11/646,613 dated Feb. 2, 2010, superceded by Office Action issued Mar. 8, 2010.
U.S. Office Action issued in U.S. Appl. No. 11/646,597 dated Mar. 8, 2010.
U.S. Office Action issued in U.S. Appl. No. 11/646,586 dated Mar. 10, 2010.
U.S. Office Action issued in U.S. Appl.No. 11/646,585 dated Mar. 18, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
Article by Greg Scoblete, Sandisk Introduces Flash Drives, MP3 Players, TWICE, Jan. 20, 2006, 21, 3; Research Library, p. 4.
SanDisk Sana™ e200 User Guide.
U.S. Office Action issued in U.S. Appl. No. 11/785,404 dated Mar. 25, 2010.
U.S. Office Action issued in U.S. Appl. No. 11/785,399 dated Apr. 1, 2010.
U.S. Office Action issued in U.S. Appl. No. 11/785,403 dated May 12, 2010.
U.S. Office Action issued in U.S. Appl. No. 11/785,405 dated Jun. 4, 2010.
Indian Office Action dated May 14, 2010.

* cited by examiner

TOUCH SCREEN DEVICE AND METHOD OF METHOD OF DISPLAYING IMAGES THEREON

This is a Continuation application of Ser. No. 11/646,586 filed on Dec. 28, 2006, which claims priority to Application Serial No. 10-2006-0046696 filed in Korea on May 24, 2006, the entirety of which are incorporated herein by reference.

BACKGROUND

1. Field

A touch screen device and operating method thereof are disclosed herein.

2. Background of the Related Art

In general, menu information is provided for all digital equipment, such as MP3 players, portable multimedia players (PMP), personal digital assistants (PDA), or notebook computers according to their functions or characteristics such that a user can more easily utilize the digital equipment. Since a variety of services and functions are being provided to the individual equipment, the menu information is considered indispensable information. Such menu information is generally structured to include a main menu for providing functions by categories and submenus provided to respective menu items of the main menu. In such a case, detailed menus are displayed and desired functions are executed according to menu selection. Further, a menu setting function, such as a function for adding frequently used functions to Favorites, is provided.

However, when a user wants to select a desired function using such menu information, he/she selects a desired main menu from the menu information through key operations and selects a sub-menu included in the main menu. By way of example, a method of using menus in a portable information terminal which provides a variety of multimedia information, such as music, games, photographs, or moving images will be described. A portable information terminal displays a menu on an initial screen to select a medium when electric power is first applied thereto. Then, if a user selects any one of the menus, the user can proceed to the next sub-menus. The user confirms the sub-menus and selects a desired menu to execute a desired function. At this time, if the user utilizes another function, he/she must return to the initial menu screen and then select another menu on the initial menu screen. That is, if the user sets the audio quality or tone in a music playback mode while playing back MP3 files in the music playback mode, he/she must change menus from the current music playback mode to an upper menu and select again a setting mode from the initial menu mode. In other words, the user moves from a current menu to the initial menu and then selects a desired function through a plurality of key operations.

In a conventional method of displaying menus, a process of moving between menus is complicated. Further, since the digital equipment with complicated functions has a variety of menus in proportion to the provided functions, a process of moving between menus is much more complicated and a user has difficulty operating the menus. Since the menus are provided in the form of a general tree structure, it is inconvenient as a user must pass through a plurality of operations to select a specific function.

BRIEF DESCRIPTION OF THE DRAWINGS

Embodiments will be described in detail with reference to the following drawings in which like reference numerals refer to like elements wherein.

DETAILED DESCRIPTION OF PREFERRED EMBODIMENTS

Hereinafter, embodiments of a touch screen device and a method of displaying images on the touch screen device will be described in detail with reference to the accompanying drawings.

A touch screen device according to embodiments may be applied to all kinds of digital equipment to which a touch screen is mounted, such as a MP3 player, a portable media player, a PDA, a portable terminal, a navigation system, or a notebook computer. Moreover, the touch screen device according to embodiments may be used with electronic books, newspapers, magazines, etc., different types of portable devices, for example, handsets, MP3 players, notebook computers, etc., audio applications, navigation applications, televisions, monitors, or other types of devices using a display, either monochrome or color. For convenience of explanation, an MP3 player will be described herein by way of example. Further, touch can include any type of direct or indirect touch or contact, using, for example, a finger or stylus.

Figure 1:
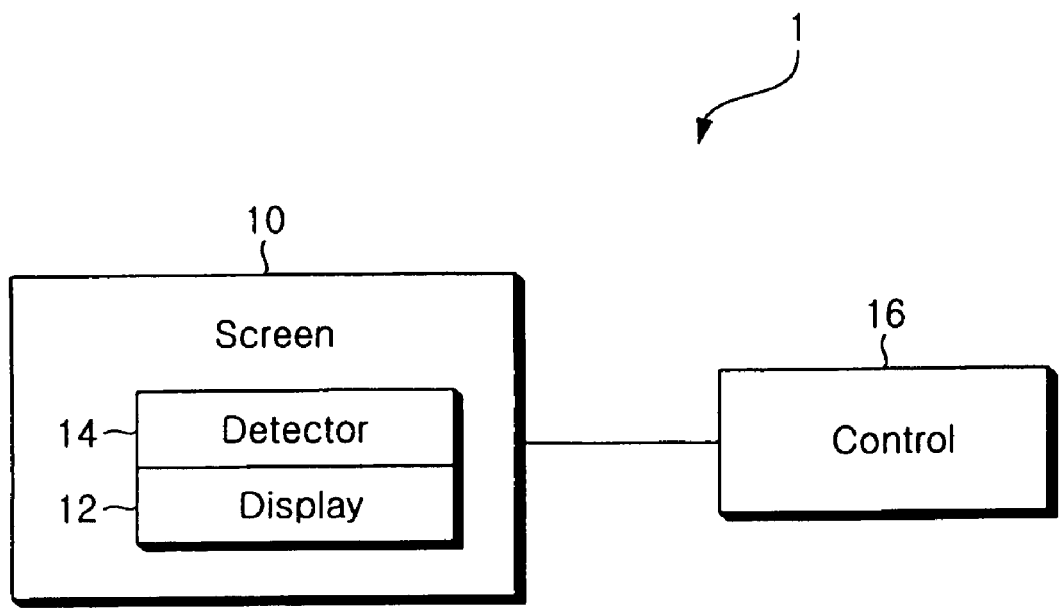
FIG. 1 is a block diagram of a touch screen device according to an embodiment.

FIG. 1 is a block diagram of a touch screen device according to an embodiment. As shown in FIG. 1, the touch screen device 1 may comprise a screen 10 having a function of inputting and displaying information. The screen 10 may comprise a display 12 for displaying a plurality of menu information (icons, etc.) and data thereon, and a detector 14 for detecting a touching action to select execution menus 30*a* and 30*b* or data displayed on the display 12. When a user touches the screen 10 to select the execution menus 50 (→30*a* and 30*b*) or data displayed on the display 12 using, for example, a finger 40 or a stylus pen, the detector 14 may detect whether the screen 10, for example, has been touched.

The display 12 may be a general screen display device, such as a liquid crystal display (LCD), a plasma display panel (PDP), a light emitting diode (LED), or an organic light emitting diode (OLED). In one embodiment, the detector 14 may be a thin layer provided on the front surface of the display 12, which employs a resistive or capacitive method; however, other touch screens, such as a touch screen that utilizes infrared rays may be utilized.

In the case of a resistive touch screen, the touch screen may be configured in such a manner that two layers coated with resistive materials are provided and kept at a constant interval, and electric currents may be supplied to both the layers. If pressure is applied to a layer to come into contact with another layer, an amount of electric current flowing along the layers may be changed and a touch point thus detected by the change of electric current. On the other hand, in the case of a capacitive touch screen, the touch screen may be configured in such a manner that both surfaces of glass are coated with conductive metal and electric voltage is applied to edges of the glass. In such a case, high frequencies flow along the surface of the touch screen and a high frequency waveform may be distorted when a finger or stylus touches on the surface of the touch screen, and thus, a touch point detected by the change of the waveform.

The screen 10 may be connected to a controller 16 that controls access of a user command corresponding to the execution menus 30a and 30b selected according to the detection results of the detector 14 or data, such as additional information, or messages to be described below, from a storage device (not shown), and the display of the command or data onto the screen 10. The controller 16 may control not only the aforementioned display, but also the overall operations of digital equipment. Further, the controller may operate the digital equipment according to the detection results of the detector 14.

Further, according to certain embodiments, the controller 16 may display a variety of images including the execution menus through display windows. That is, the controller 16 may display a plurality of windows containing images in an overlapped manner (hereinafter, referred to as a 'toggle mode'). The display windows may not completely overlap one another, so that some edges or corners thereof may not be covered.

If a touch is detected on an underlying display window 20b provided under an overlying display window 20a, the controller 16 may cause the touched display window to be displayed as an overlying display window. In the case of a double touch in which a display window is touched twice within a predetermined period of time, the toggle mode may be canceled and the double touched display window may be displayed on the display in a full size.

The controller 16 may display images and execution menus 30a and 30b through the display window 20 in various ways, as will be described below in detail.

Figure 2:
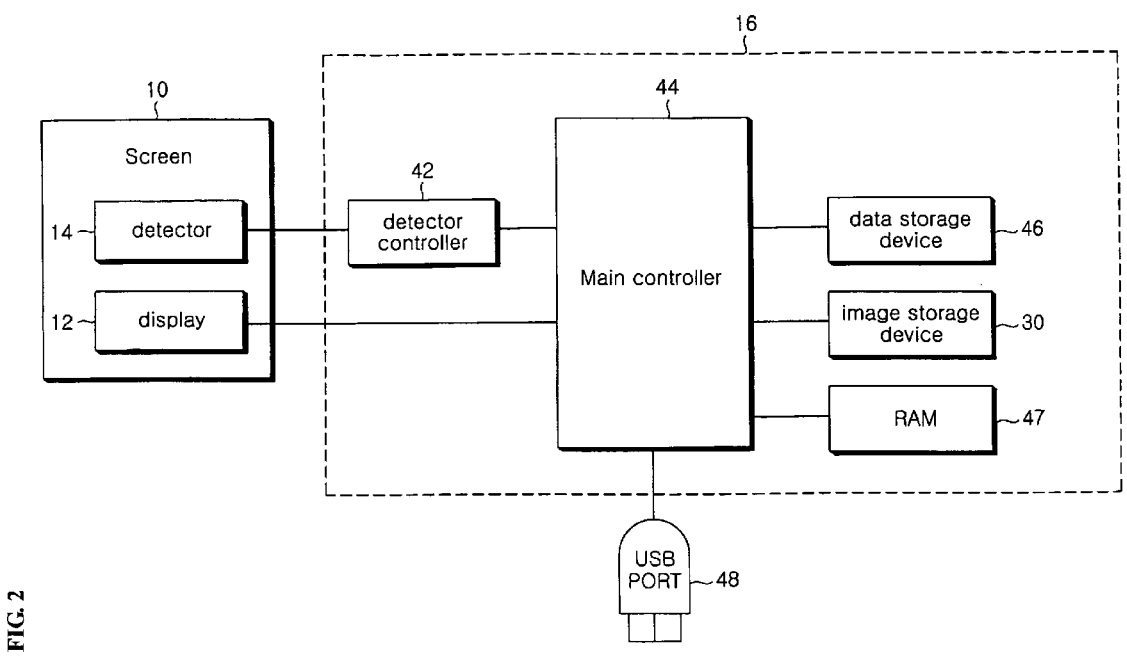
FIG. 2 is a block diagram of a touch screen device according to an embodiment.

In FIG. 2, a touch screen device according to an embodiment is described in more detail. As shown in FIG. 2, the screen 10 may comprise a touch screen or detector 14 and a display 12. The touch screen or detector 14 may be connected to a touch screen or detector controller 42 for signalizing a touch detected on the touch screen or detector 14. The display 12 and the touch screen or detector controller 42 may be connected to and operated under the control of a main controller 44.

Further, an image storage device 45 for storing information on a variety of images to be displayed on the display 12 may be connected to the main controller 44. The image storage device may include menus in the respective operating modes and stores images representing the modes and menus.

Furthermore, a data storage device 46 for storing, for example, MP3 files may be connected to the main controller 44. For example, a NAND memory capable of rapidly and easily storing and reading out a large amount of information may be used as the data storage device 46.

A portion of the data storage device 46 may be used as the panel information storage device 45. However, use of a separate panel information storage device 45 constructed of a NOR memory that is relatively superior in the stability of information may be advantageous.

In addition, a universal serial bus (USB) port 48 serving as an interface for modifying data may be connected to the main controller 44. The USB port 48 may be connected to an external device such that the partition information and data stored in the data storage device 46 may be updated, deleted, or modified.

Moreover, the main controller 44 may be provided with a random access memory (RAM) 47 for driving the display device, for which a synchronous dynamic RAM (SDRAM) may be used.

Hereinafter, the operation of a touch screen device according to an embodiment will be described in detail with reference to a method of displaying images.

Figure 3A:
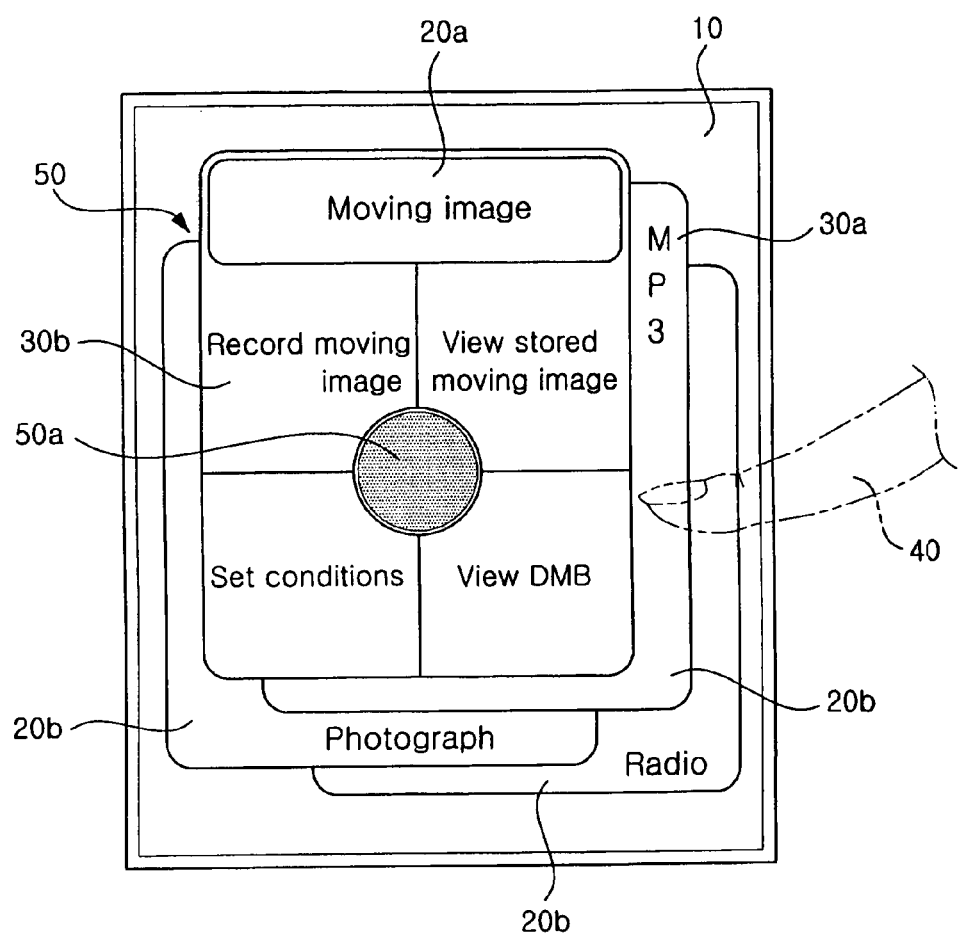
FIGS. 3A to 3D are exemplary views showing execution menus displayed on a touch screen device according to an embodiment.
Figure 3B:
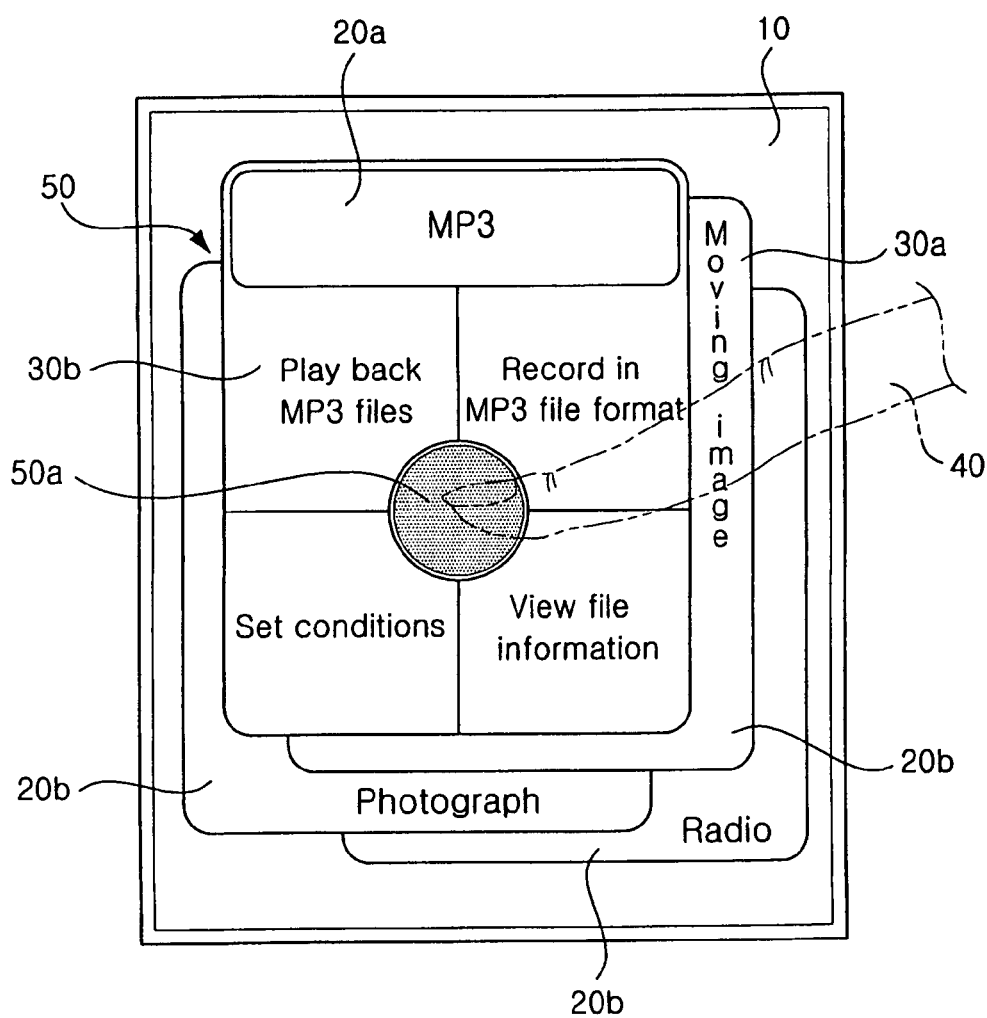
Figure 3C:
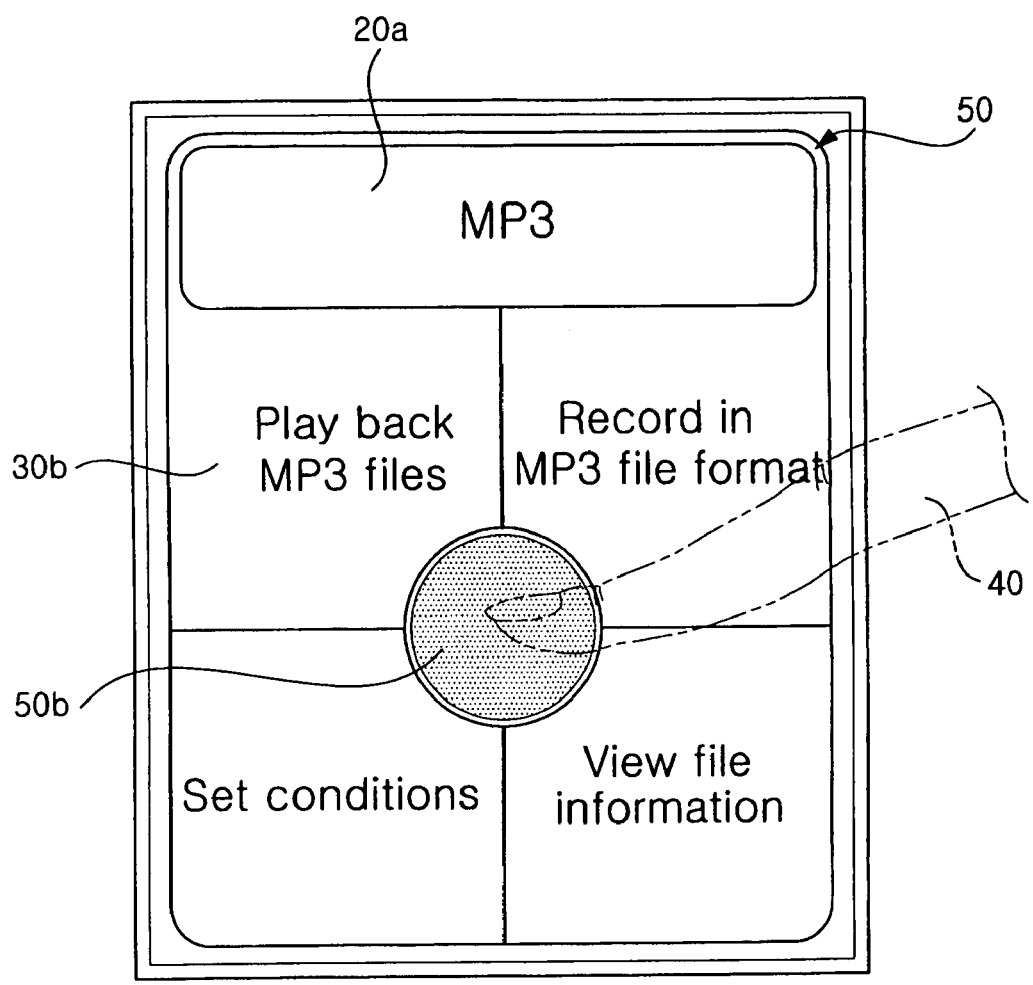
Figure 3D:
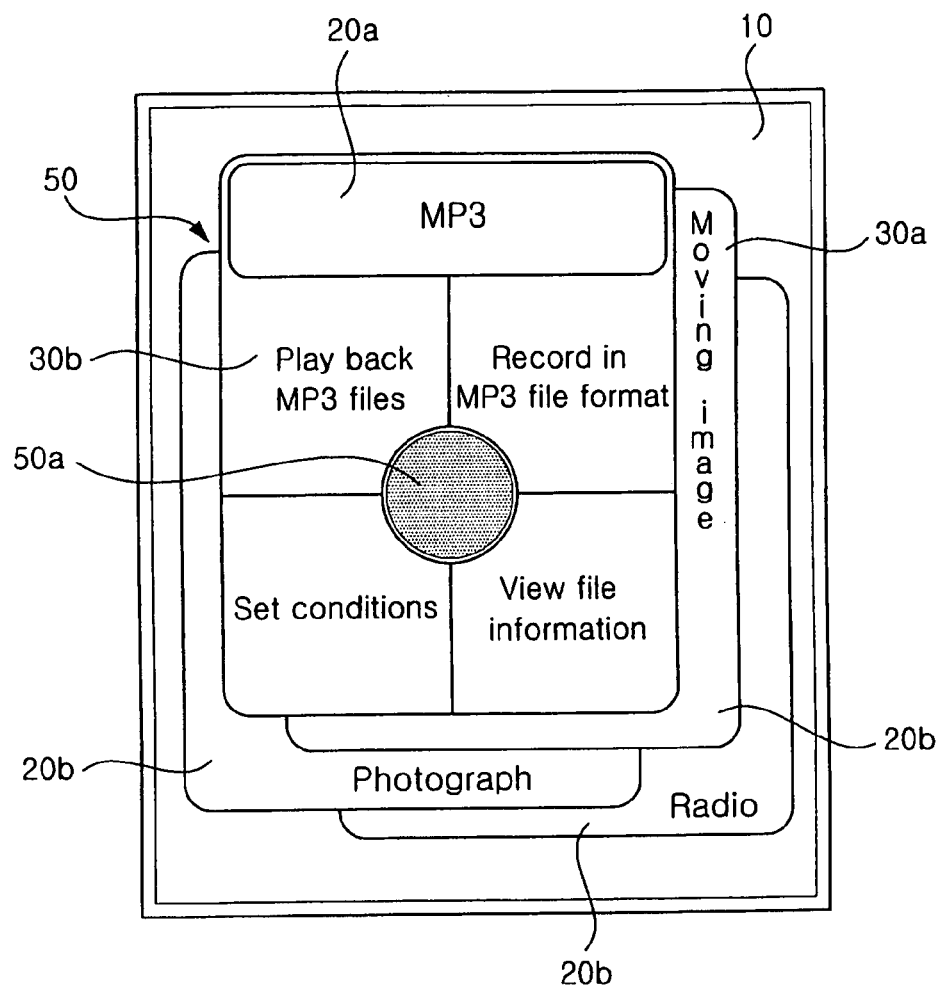
Figure 4A:
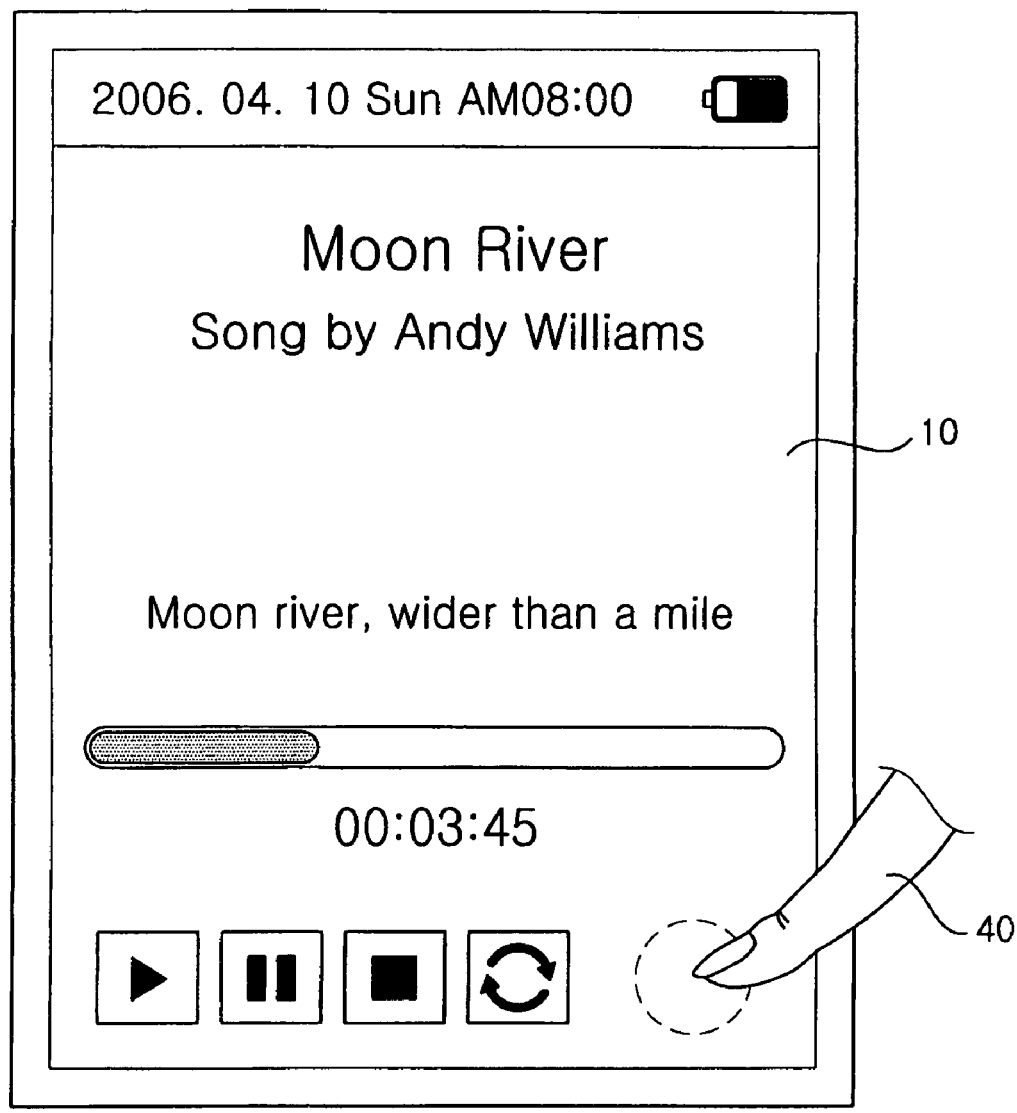
FIGS. 4A and 4B are exemplary views showing execution menus displayed according to another embodiment.
Figure 4B:
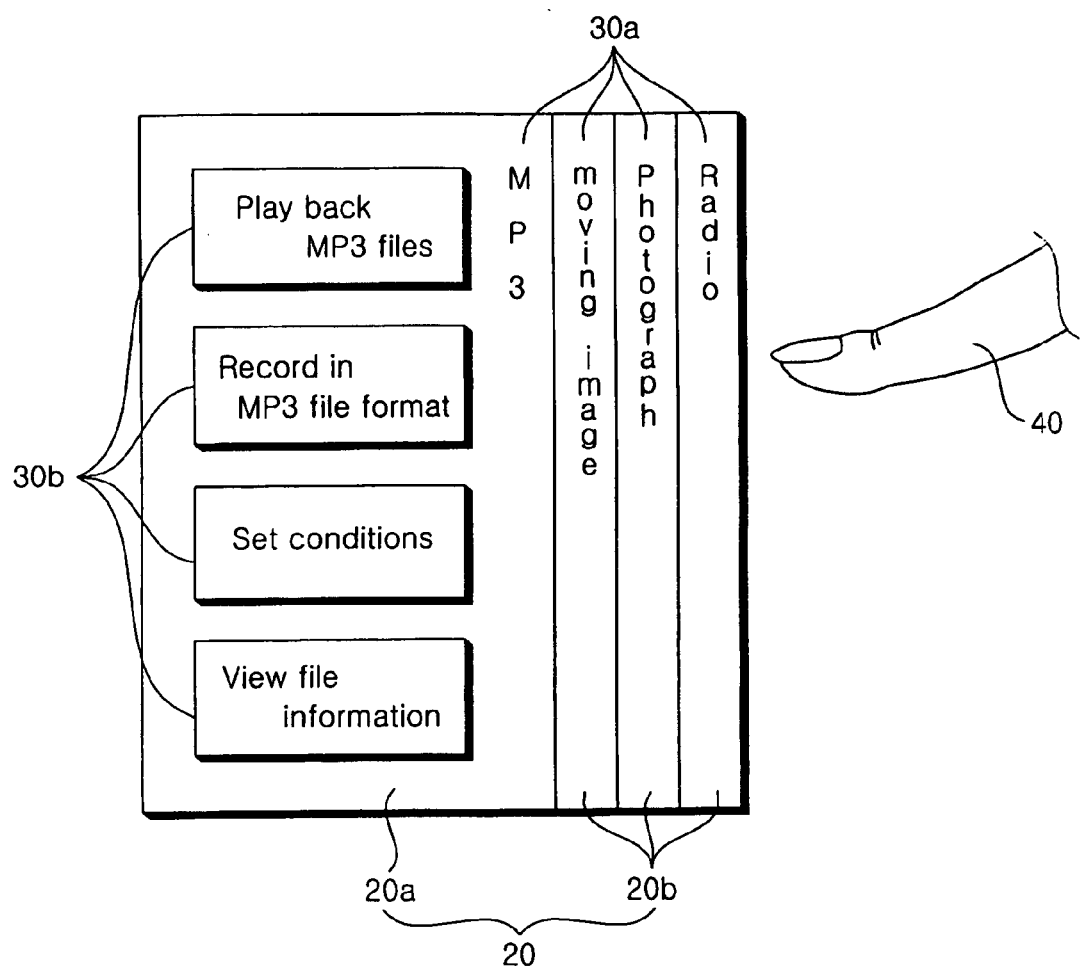

FIGS. 3A to 3D are exemplary views showing execution menus displayed in the touch screen device according to an embodiment, and FIGS. 4A and 4B are exemplary views showing execution menus displayed according to another embodiment.

As shown in FIG. 3A, a plurality of display windows 20 may be displayed on the display 12. The display windows 20a and 20b may be displayed in an overlapped manner. In such a case, the underlying display windows 20b placed under the overlying display window 20a may be displayed in such a manner that some portions thereof are not covered. As shown in FIG. 3A, execution menus 30a indicating the respective display windows 20b are shown on some portions of the underlying display windows 20b which are placed under the overlying display window but can be seen from the outside.

Further, as can be seen in FIG. 3A, a title of the overlying display window 21a, in this example "Moving image" may be displayed at a topmost portion of the display window 21a. Only titles of the underlying display windows 20b may be displayed.

In this embodiment, the execution menus have a tree structure. That is, there are upper execution menus 30a which contain the detailed lower execution menus 30b, respectively. In addition, the lower execution menus 30b also contain detailed sub-execution menus, respectively. For convenience of explanation, each level is referred to as a layer. In other words, the execution menus 30a exist on a first layer, and the detailed execution menus 30b of a second layer exist under each of the execution menus 30a of the first layer. In the same manner, execution menus of third and fourth layers exist under the execution menus of the second and third layers, respectively.

Table 1 shows an example of the execution menus having a tree structure according to layers.

TABLE 1

| Layer 1 | Layer 2 | Layer 3 |
|---|---|---|
| Moving image | Record moving image | Omitted |
| | View stored moving image | Omitted |
| | View DMB | Omitted |
| | Set conditions | Set storage method |
| | | Set image quality |
| | | Set DMB receiving conditions |
| | | Set playback conditions |
| MP3 | Play back MP3 files | Omitted |
| | Record in MP3 file format | Omitted |
| | View file information | Omitted |
| | Set conditions | Omitted |
| Photograph | | Omitted |
| Radio | | Omitted |

Referring to FIG. 3A, the respective display windows 20a, 20b show the execution menus belonging to the same layer. That is, the execution menus 30a, such as "moving image", "MP3", "photograph" and "radio" which belong to the first layer, are displayed on the display windows 20b.

However, the execution menus 30b ("shoot moving image," "view stored moving image," "view DMB" and "set conditions") of a lower layer (a second layer) belonging to the execution menu 30a ("moving image") are displayed on the overlying display window 20a. Here, if an execution menu 30b displayed on the overlying display window 20a is touched, the controller 16 may execute the relevant menu. At this time, the menu may be executed only through the execution menus 30b displayed on the overlying display window 20a.

As shown in FIG. 3A, in this embodiment, if the underlying display window 20b placed under the overlying display window 20a is touched in a state where the execution menus are displayed on the display windows 20a, 20b in a toggle mode, the touched display window 20b may be displayed as the overlying display window.

If the display window corresponding to "MP3" is touched as shown in FIG. 3A, the "MP3" display window may be displayed on the overlying layer as shown in FIG. 3B. Then, the lower execution menus 30b of the "MP3" menu, such as "playback MP3 files", "record in MP3 file format", "view file information" and "set conditions" are displayed on the "MP3" display window.

In one embodiment, if the touch is a double touch in which a display window is touched twice within a predetermined period of time, the toggle mode may be canceled and the double touched display window displayed on the display in a full size. A state where the toggle mode is canceled is shown in FIG. 3C.

Further, a toggle mode cancel area 50a for canceling the toggle mode may be provided at a portion of the display window 20a. The toggle mode cancel area 50a may cancel the toggle mode when the touch is input in the toggle mode. The embodiments of FIGS. 3A and 3B show the toggle mode cancel area 50a provided at a center of the display window 20a. For example, if the toggle mode cancel area 50a is touched in a state shown in FIG. 3B, the toggle mode may be canceled and the touched display window 20a displayed on the display 12 in a full size as shown in FIG. 3C.

A toggle mode selection area 50b may be provided at a portion of the display window 20a in which the toggle mode is canceled. The toggle mode selection area 50b may receive a touch and switch a display mode to the toggle mode. FIG. 3C shows the toggle mode selection area 50b provided at the center of the display window. For example, if the toggle mode selection area 50b of FIG. 3C is touched, the display mode may be switched to the toggle mode as shown in FIG. 3D.

The toggle mode cancel area 50a and the toggle mode selection area 50b may be displayed in the same region. That is, a portion functioning as the toggle mode cancel area 50a in the toggle mode may be operated as the toggle mode selection area 50b when the toggle mode has been canceled.

There are a variety of ways to perform the toggle mode according to embodiments. FIGS. 4A and 4B show as an embodiment implemented using another display window.

As shown in FIG. 4A, display windows 20a and 20b in this embodiment may be displayed in such a manner that execution menus 30a may be shown at the sides of the display windows. Menu items of the execution menus 30a and 30b may be the same as those described in the previous embodiment(s). If an underlying display window 20b displayed under an overlying display window 20a is touched, the touched display window 20b may be displayed to be an overlaying display window.

That is, if an "MP3" execution menu 30a is touched in a state shown in FIG. 4A, an "MP3" display window may be displayed as an overlying display screen, in this embodiment, as shown in FIG. 4B. At the same time, lower execution menus 30b of the "MP3" execution menu 30a may be displayed on the overlying display window. Although the toggle mode cancel and selection areas are not illustrated and described in this embodiment, the cancel and selection areas may be applied thereto in the same manner as the previous embodiment.

Figure 5:
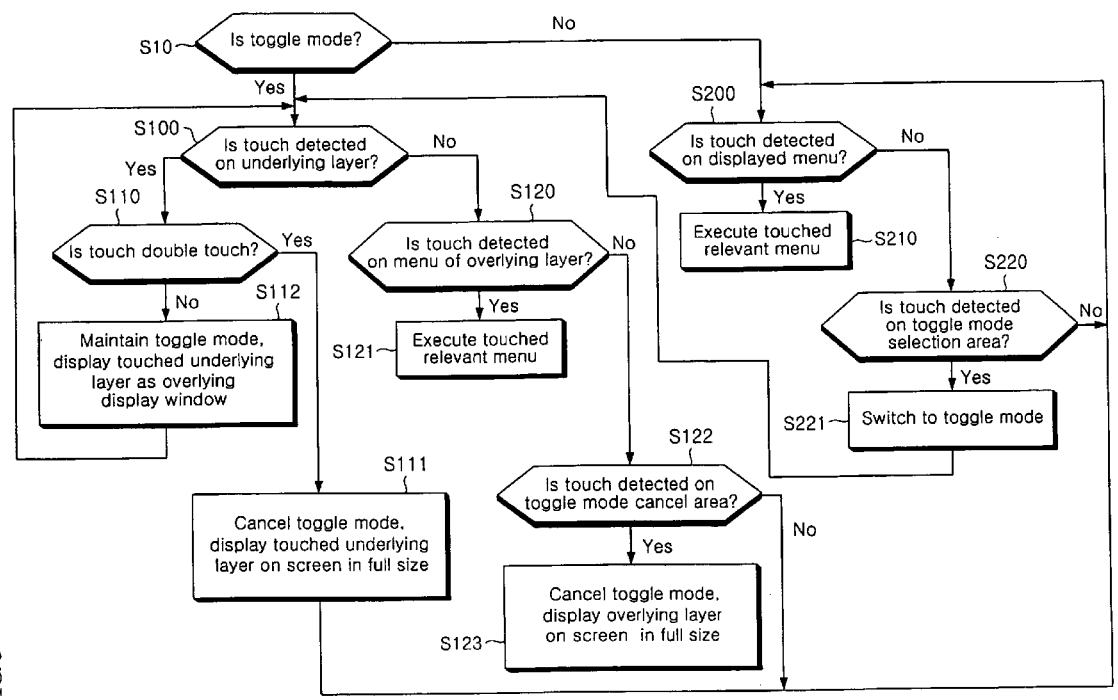
FIG. 5 is a flow chart of a method of displaying images on a touch screen device according to an embodiment.

Hereinafter, the execution sequence of embodiments, which has been described with reference to the exemplary views of FIGS. 3 to 4, will be described again with reference to a flowchart of FIG. 5. FIG. 5 is a flowchart illustrating the execution sequence of an embodiment.

As shown in FIG. 5, it may be determined whether the display device is currently in a toggle mode, in step S10. If it is determined that the display device is in a toggle mode, it may then be determined whether a touch is detected on an underlying layer, in step S100. If it is determined that a touch is detected on the underlying layer, it may then be determined whether the touch is a double touch, in step S110.

If the touch is a double touch, the display window 20b of the touched underlying layer may be displayed on a screen in a full size after the toggle mode has been canceled, and a full screen mode maintained, in step S111. At this time, if the touch is not a double touch, the display window 20b of the touched underlying layer may be displayed as an overlying display window, and the toggle mode maintained, in step S112. On the other hand, if it is determined in step S100 that a touch is not detected on the display window 20b of an underlying layer, it may then be determined whether a touch is detected on a menu of the display window 20a of the overlying layer, in step S120.

If it is determined that a touch is detected on a menu, the detected menu may be executed, in step S121. However, if a touch is not detected on a menu, it may be determined whether a touch is detected on a toggle mode cancel area, in step S122.

If it is determined in step S122 that a touch is detected on the toggle mode cancel area, the display window 20a of the overlying layer may be displayed on the screen in a full size after the toggle mode has been canceled, and the full screen mode maintained, in step S123. On the other hand, if it is determined in step S10 that the display device is currently not in the toggle mode but in the full screen mode, it may then be determined whether a touch is detected on a displayed menu, in step S200.

If it is determined in step S200 that a touch is detected on a displayed menu, the touched menu may be executed, in step S210. However, if a touch is not detected on a displayed menu, it may be determined whether a touch is detected on a toggle mode selection area, in step S220.

If it is determined in step 220 that a touch is detected on the toggle mode selection area, the display may be switched to the toggle mode such that the toggle mode may be maintained, in step S221. However, if a touch is not detected on the toggle mode selection area, the full screen mode may be maintained.

In a touch screen device and a method of displaying images thereon according to embodiments described above in detail, at least the following advantages may be expected.

One or more execution menus are grouped and a group of the execution menus is alternately selected and displayed on the touch screen device only by means of a touching action. Thus, menus may be easily navigated and the execution menus may be easily and efficiently selected.

Further, the toggle mode may be selectively executed. Thus, a user may select the execution menus in various ways and operate the digital equipment according to his/her preference.

Embodiments broadly described herein provide a method of displaying images on a touch screen device, wherein one or more menu information grouped by specific functions is provided and other grouped menu information is displayed only by means of a drag operation such that a user can easily move to a desired menu.

According to one embodiment, there is provided a method of displaying images on a touch screen device provided with a screen unit including a display unit for displaying the images thereon and a touch panel for detecting a touch on a screen by a user, wherein two or more display windows are displayed in a partially overlapped manner, and if the user's touch is detected on an underlying display window covered by an overlying display window, a display form is changed in response to the touch. If the user's touch is detected on the underlying display window covered by the overlying display window, the touched lower display window may be displayed as an overlying display window. Further, if a double touch by a user is detected on the underlying display window covered by the overlying display window, a toggle mode in which the display windows are displayed in an overlapped manner may be canceled and the double touched underlying display window may be displayed on the screen unit in a full size. On the overlying display window may be provided a toggle mode cancel area for canceling a toggle mode, in which the display windows may be displayed in an overlapped manner, when the toggle mode cancel area is touched.

In a case where a toggle mode in which the display windows are displayed in an overlapped manner is canceled and a single display window is displayed on the screen unit in a full size when the toggle mode cancel area is touched, a toggle mode selection area for switching a display mode to the toggle mode when the toggle mode selection area is touched may be provided on the single display window. Execution menus that the user can select may be displayed on the display windows. The execution menus belonging to the same layer may be grouped and displayed on the display windows, and lower execution menus belonging to a lower layer of the execution menu may be displayed on the overlying display window. Further, the execution menus may be executed only by a touch inputted through the overlying display window.

According to another embodiment, there is provided a touch screen device, including a screen unit including a display unit for displaying images thereon and a touch panel for detecting a touch on a screen by a user, and a control unit for controlling operations of the device in accordance with the screen touch detected by the touch panel, wherein the control unit causes two or more display windows to be displayed in a partially overlapped manner, and if the user's touch is detected on an underlying display window covered by an overlying display window, a display form is changed in response to the touch. When the user's touch is detected on the underlying display window covered by the overlying display window, the control unit may cause the underlying display window to be displayed as an overlying display window, and if a double touch is detected, the control unit may cancel a toggle mode, in which the display windows are displayed in an overlapped manner, and cause the double touched display window to be displayed on the screen unit in a full size.

Further, the control unit may cause the overlying display window in the toggle mode to be provided with a toggle mode cancel area for canceling the toggle mode when the toggle mode cancel area is touched, and a display window in a state where the toggle mode is canceled to be provided with a toggle mode selection area for switching a display mode to the toggle mode when the toggle mode selection area is touched. Execution menus that the user can select may be displayed on the display windows. Further, execution menus belonging to the same layer may be grouped and displayed on one or more display windows displayed in an overlapped manner, and lower execution menus belonging to a lower layer of the execution menu may be displayed together on the overlying display window.

According to a further embodiment, there is provided digital equipment mounted with a touch screen which comprises a screen unit including a display unit for displaying the images thereon and a touch panel for detecting a touch on a screen by a user, wherein two or more display windows are displayed in a partially overlapped manner, and if the user's touch is detected on an underlying display window covered by an overlying display window, a display form is changed in response to the touch.

According to a still further embodiment, there is provided digital equipment mounted with a touch screen device which comprises a screen unit including a display unit for displaying images thereon and a touch panel for detecting a touch on a screen by a user; and a control unit for controlling operations of the device in accordance with the screen touch detected by the touch panel, wherein the control unit causes two or more display windows to be displayed in a partially overlapped manner, and if the user's touch is detected on an underlying display window covered by an overlying display window, a display form is changed in response to the touch.

According to embodiments, menus belonging to an upper layer and menus belonging to a lower layer may be easily navigated and selected, and thus the execution menus may be easily selected.

Embodiments broadly disclosed herein further provide a method of displaying images on a touch screen device provided with a screen including a display configured to display the images thereon and a detector configured to detect a touch on the screen, the method comprising displaying two or more display windows in a partially overlapped manner, and if a touch is detected on an underlying display window covered by an overlying display window, changing a display form corresponding to the underlying display window in response to the touch. Changing a display form may include displaying the touched lower display window as an overlying display window.

Further, the method may further include, if a double touch is detected on the underlying display window covered by the overlying display window, canceling a toggle mode in which the display windows are displayed in an overlapped manner and displaying the double touched underlying display window on the screen in a full size. The method may further include, where a toggle mode in which the display windows are displayed in an overlapped manner is canceled and a single display window is displayed on the screen in a full size when the toggle mode cancel area is touched, providing a toggle mode selection area for switching a display mode to the toggle mode when the toggle mode selection area is touched on the single display window. The method may also include providing on the overlying display window a toggle mode cancel area for canceling a toggle mode, in which the display windows are displayed in an overlapped manner, when the toggle mode cancel area is touched.

Additionally, the method may include displaying execution menus on the display windows. The execution menus belonging to the same layer may be grouped and displayed on the display windows. Lower execution menus belonging to a lower layer of the execution menu may be displayed on the overlying display window. Further, the execution menus may be executed only by a touch input through the overlying display window.

A method of displaying images on a touch screen device mounted on digital equipment may include the method disclosed herein. The digital equipment may include a MP3 player, a portable media player, a portable terminal, a navigation system, or a notebook computer.

Embodiments broadly disclosed herein further provide a touch screen device, including a screen comprising a display configured to display images thereon and a detector configured to detect a touch on the screen, and a controller configured to control operation of the touch screen device in accordance with the screen touch detected by the detector, wherein the controller causes two or more display windows to be displayed in a partially overlapped manner, and if the touch is detected on an underlying display window covered by an overlying display window, a display form corresponding to the underlying display window is changed in response to the touch. When the touch is detected on the underlying display window covered by the overlying display window, the controller may cause the underlying display window to be displayed as an overlying display window, and if a double touch is detected, the controller may cancel a toggle mode, in which the display windows are displayed in an overlapped manner, and cause the double touched display window to be displayed on the screen in a full size. Further, the controller may cause the overlying display window in the toggle mode to be provided with a toggle mode cancel area for canceling the toggle mode when the toggle mode cancel area is touched, and a display window in a state in which the toggle mode is canceled to be provided with a toggle mode selection area for switching a display mode to the toggle mode when the toggle mode selection area is touched.

Execution menus may be displayed on the display windows. Further, execution menus belonging to the same layer may be grouped and displayed on one or more display windows displayed in an overlapped manner, and lower execution menus belonging to a lower layer of the execution menu may be displayed together on the overlying display window.

Digital equipment may include the disclosed touch screen device. The digital equipment may include a MP3 player, a portable media player, a PDA, a portable terminal, a navigation system, or a notebook computer.

Embodiments broadly disclosed herein further provide digital equipment mounted with a touch screen, the touch screen comprising a screen including a display configured to display the images thereon and a detector configured to detect a touch on the screen, wherein two or more display windows are displayed in a partially overlapped manner, and if the touch is detected on an underlying display window covered by an overlying display window, a display form corresponding to the underlying display window is changed in response to the touch. The digital equipment may include a MP3 player, a portable media player, a PDA, a portable terminal, a navigation system, or a notebook computer.

Embodiments broadly disclosed herein further provide a touch screen device, including a touch panel for detecting a screen touch, a touch panel controller configured to signalize the touch detected on the touch panel and controlling the touch panel, a display configured to display images, an image storage device configured display images, and a main controller configured to control operations of the touch panel controller and the display, wherein the main controller allows two or more display windows to be displayed in a partially overlapped manner and allows a display form to be changed corresponding to underlying display window if the touch is detected on the underlying display window covered by an overlying display window. The image storage device may be a NOR flash memory.

The device may further include a USB port connected to an external device for updating or modifying the image information stored in the image storage device. Also, the device may further include a data storage device configured to store data of the touch screen device, and a RAM configured to drive the touch screen device. A portion of the data storage device may be configured into the image storage device.

When the touch is detected on the underlying display window covered by the overlying display window, the main controller may cause the underlying display window to be displayed as an overlying display window, and if a double touch is detected, the main controller may cancel a toggle mode, in which the display windows are displayed in an overlapped manner, and cause the double touched display window to be displayed on the screen in a full size. Further, the main controller may cause the overlying display window in the toggle mode to be provided with a toggle mode cancel area for canceling the toggle mode when the toggle mode cancel area is touched, and a display window in a state where the toggle mode is canceled to be provided with a toggle mode selection area for switching a display mode to the toggle mode when the toggle mode selection area is touched.

Execution menus may be displayed on the display windows. Further, execution menus belonging to the same layer may be grouped and displayed on one or more display windows displayed in an overlapped manner, and lower execution menus belonging to a lower layer of the execution menu may be displayed together on the overlying display window.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A method of displaying images on a touch screen device provided with a screen comprising a display configured to display the images thereon and a detector configured to detect a touch on the screen, the method comprising:

displaying two or more display windows in a partially overlapped manner, wherein a title for a first display window which is displayed uppermost among the two or more display windows is located at a substantially topmost position and a title for a second display window among underlying display windows covered by the first display window is located at a specific side position other than the substantially topmost position; and if a touch is detected on the second display window, changing a display form of the two or more display windows, such that the second display window is displayed as a new uppermost display window instead of the first display window and the title for the first display window automatically moves to the specific side position and the title for the second display window automatically moves to the substantially topmost position.

2. The method as claimed in claim 1, further comprising, if a double touch is detected on the underlying display window covered by the uppermost display window, canceling a toggle mode in which the display windows are displayed in an overlapped manner and displaying the double touched underlying display window on the screen in a full size.

3. The method as claimed in claim 1, further comprising providing on the uppermost display window a toggle mode cancel area for canceling a toggle mode, in which the display windows are displayed in an overlapped manner, when the toggle mode cancel area is touched.

4. The method as claimed in claim 3, further comprising when a toggle mode, in which the display windows are displayed in an overlapped manner is canceled, and a single display window is displayed on the screen in a full size, when the toggle mode cancel area is touched, providing a toggle mode selection area for switching a display mode to the toggle mode when the toggle mode selection area is touched on the single display window.

5. The method as claimed in claim 1, further comprising displaying execution menus on the display windows.

6. The method as claimed in claim 5, wherein the execution menus belonging to a first layer are grouped and displayed on the display windows.

7. The method as claimed in claim 6, wherein lower execution menus belonging to a second layer of one of the execution menus are displayed on the uppermost display window, wherein the second layer is a lower layer of the first layer.

8. The method as claimed in claim 5, wherein the execution menus are executed only by a touch input through the uppermost display window.

9. A method of displaying images on a touch screen device mounted on digital equipment, comprising the method of claim 1.

10. The method of claim 9, wherein the digital equipment comprises a MP3 player, a portable media player, a portable terminal, a navigation system, or a notebook computer.

11. A touch screen device, comprising:
a screen comprising a display configured to display images thereon and a detector configured to detect a touch on the screen; and
a controller configured to control operation of the touch screen device in accordance with the screen touch detected by the detector, wherein the controller causes two or more display windows to be displayed in a partially overlapped manner, wherein a title for a first display window which is displayed uppermost among the two or more display windows is located at a substantially topmost position and a title for a second display window among underlying display windows covered by the first display window is located at a specific side position other than the substantially topmost position and if the touch is detected on the second display window, a display form of the two or more display windows is changed, such that the second display window is displayed as a new uppermost display window instead of the first display window and the title for the first display window automatically moves to the specific side position and the title for the second display window automatically moves to the substantially topmost position.

12. The device as claimed in claim 11, wherein if a double touch is detected, the controller cancels a toggle mode, in which the display windows are displayed in an overlapped manner, and causes the double touched display window to be displayed on the screen in a full size.

13. The device as claimed in claim 11, wherein the controller causes the uppermost display window in the toggle mode to be provided with a toggle mode cancel area for canceling the toggle mode when the toggle mode cancel area is touched, and a display window in a state in which the toggle mode is canceled to be provided with a toggle mode selection area for switching a display mode to the toggle mode when the toggle mode selection area is touched.

14. The device as claimed in claim 11, wherein execution menus are displayed on the display windows.

15. The device as claimed in claim 14, wherein execution menus belonging to a first layer are grouped and displayed on the display windows displayed in an overlapped manner, and lower execution menus belonging to second layer of one of the execution menus are displayed together on the uppermost display window, wherein the second layer is a lower layer of the first layer.

16. Digital equipment comprising the touch screen device of claim 11.

17. The digital equipment of claim 16, wherein the digital equipment comprises a MP3 player, a portable media player, a PDA, a portable terminal, a navigation system, or a notebook computer.

18. Digital equipment mounted with a touch screen, the touch screen comprising:
a screen comprising a display configured to display the images thereon and a detector configured to detect a touch on the screen, wherein two or more display windows are displayed in a partially overlapped manner, wherein a title for a first display window which is displayed uppermost among the two or more display windows is located at a substantially topmost position and a title for a second display window among underlying display windows covered by the first display window is located at a specific side position other than the substantially topmost position, and if the touch is detected on the second display window, a display form of the two or more display windows is changed, such that the second display window is displayed as a new uppermost display window instead of the first display window and the title for the first display window automatically moves to the specific side position and the title for the second display window automatically moves to the substantially topmost position.

19. The digital equipment of claim 17, wherein the digital equipment comprises a MP3 player, a portable media player, a PDA, a portable terminal, a navigation system, or a notebook computer.

20. A touch screen device, comprising:
a touch panel for detecting a screen touch;
a touch panel controller configured to signalize the touch detected on the touch panel and controlling the touch panel;
a display configured to display images;
an image storage device configured to store display images; and
a main controller configured to control operations of the touch panel controller and the display, wherein the main controller allows two or more display windows to be displayed in a partially overlapped manner, wherein a title for a first display window which is displayed uppermost among the two or more display windows is located at a substantially topmost position and a title for a second display window among underlying display windows covered by the first display window is located at a specific side position other than the substantially topmost position and wherein the controller allows a display form of the two or more display windows to be changed if the touch is detected on the second display window, such that the second display window is displayed as a new uppermost display window instead of the first display window and the title for the first display window automatically moves to the specific side position and the title for the second display window automatically moves to the substantially topmost position.

21. The device as claimed in claim 20, wherein the image storage device is a NOR flash memory.

22. The device as claimed in claim 21, further comprising:
a USB port connected to an external device configured to update or modify the image information stored in the image storage device.

23. The device as claimed in claim 20, further comprising:
a data storage device configured to store data of the touch screen device; and
a RAM configured to drive the touch screen device.

24. The device as claimed in claim 23, wherein a portion of the data storage device is configured into the image storage device.

25. The device as claimed in claim 20, wherein if a double touch is detected, the main controller cancels a toggle mode, in which the display windows are displayed in an overlapped manner, and causes the double touched display window to be displayed on the screen in a full size.

26. The device as claimed in claim 20, wherein the main controller causes the uppermost display window in the toggle mode to be provided with a toggle mode cancel area for canceling the toggle mode when the toggle mode cancel area is touched, and a display window in a state where the toggle mode is canceled to be provided with a toggle mode selection area for switching a display mode to the toggle mode when the toggle mode selection area is touched.

27. The device as claimed in claim 20, wherein execution menus are displayed on the display windows.

28. The device as claimed in claim 27, wherein execution menus belonging to a first layer are grouped and displayed on the display windows displayed in an overlapped manner, and lower execution menus belonging to a second layer of one of the execution menus are displayed together on the uppermost display window, wherein the second layer is a lower layer of the first layer.

* * * * *